United States Patent
Vedantam et al.

(10) Patent No.: US 10,185,801 B2
(45) Date of Patent: Jan. 22, 2019

(54) ADAPTIVE POWER GRID GENERATION

(71) Applicant: Oracle International Corporation, Redwood Shores, CA (US)

(72) Inventors: Kiran Kishore Vedantam, Santa Clara, CA (US); Aparna Ramachandran, Cupertino, CA (US); James Ballard, Palo Alto, CA (US); Mark Russell O'brien, Irvine, CA (US); Sampanna Prashant Pathak, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 57 days.

(21) Appl. No.: 15/409,152

(22) Filed: Jan. 18, 2017

(65) Prior Publication Data
US 2018/0203971 A1   Jul. 19, 2018

(51) Int. Cl.
G06F 17/50   (2006.01)

(52) U.S. Cl.
CPC ...... *G06F 17/5081* (2013.01); *G06F 17/5077* (2013.01); *G06F 2217/78* (2013.01)

(58) Field of Classification Search
USPC ........................................................ 716/111
See application file for complete search history.

(56) References Cited

U.S. PATENT DOCUMENTS

2011/0113398 A1*  5/2011  Keinert ............... G06F 17/5077
                                                              716/127

* cited by examiner

*Primary Examiner* — Bryce M Aisaka
(74) *Attorney, Agent, or Firm* — Ferguson Braswell Fraser Kubasta PC

(57) ABSTRACT

A method may include obtaining a design including cells and a power grid. The method may further include dividing the design into tiles, determining a voltage budget for a tile, calculating a voltage drop for each cell of the tile based on determining an activity factor for the cell and a peak current consumed by the cell, determining, for each cell of the tile and based on the power grid, an affected vicinity for the cell including one or more neighboring cells affected by a current drawn on the cell, determining an affected vicinity for the tile based on the affected vicinity for each cell of the subset, calculating a voltage drop for the tile based on the voltage drop for each cell of the affected vicinity for the tile, and detecting a voltage deviation when a difference between the voltage budget and the voltage drop exceeds a threshold.

20 Claims, 9 Drawing Sheets

ADAPTIVE POWER GRID GENERATION

BACKGROUND

A power grid distributes power and ground voltages to the devices in a design of an integrated circuit (i.e., chip). Designing power grids has become more complex due to increasing device counts, increasing placement densities, faster switching frequencies, and increasing power consumption. This requires the grid designer to compensate for voltage drops due to the resistance of the power grid interacting with the currents drawn by the various devices on the chip. Excessive voltage drops may reduce switching speeds and noise margins of circuits, and may inject noise that causes functional failures. A power grid is typically designed for an average cell placement density and an average current consumption. Thus the grid designer typically assumes that power density is fixed when designing a preliminary grid, and later adapts the grid design once the chip design is fleshed out in detail, and voltage drop violations are discovered.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining a design for a chip including cells and a power grid including power lines. Each cell is located at a layer. The method further includes dividing the design into tiles. Each tile includes a subset of the cells. The method further includes determining a voltage budget for a tile, calculating a voltage drop for each cell of the subset of the cells of the tile based on determining an activity factor for the cell and a peak current consumed by the cell, determining, for each cell of the subset and based on the power grid, an affected vicinity for the cell including one or more neighboring cells affected by a current drawn on the cell, determining an affected vicinity for the tile based on the affected vicinity for each cell of the subset, calculating a voltage drop for the tile based on the voltage drop for each cell of the affected vicinity for the tile, and detecting a voltage deviation for the tile when a difference between the voltage budget for the tile and the voltage drop for the tile exceeds a pre-determined threshold.

In general, in one aspect, one or more embodiments relate to a system including a design for a chip including cells and a power grid including power lines. Each cell is located at a layer. The system further includes a repository including the design and a voltage analyzer configured to divide the design into tiles. Each tile includes a subset of the cells. The voltage analyzer is further configured to determine a voltage budget for a tile, calculate a voltage drop for each cell of the subset of the cells of the tile based on determining an activity factor for the cell and a peak current consumed by the cell, determine, for each cell of the subset and based on the power grid, an affected vicinity for the cell including one or more neighboring cells affected by a current drawn on the cell, determine an affected vicinity for the tile based on the affected vicinity for each cell of the subset, calculate a voltage drop for the tile based on the voltage drop for each cell of the affected vicinity for the tile, and detect a voltage deviation for the tile when a difference between the voltage budget for the tile and the voltage drop for the tile exceeds a pre-determined threshold.

In general, in one aspect, one or more embodiments of the invention relate to a non-transitory computer readable medium including instructions that, when executed by a computer processor, perform a method including obtaining a design for a chip including cells and a power grid including power lines. Each cell is located at a layer. The method further includes dividing the design into tiles. Each tile includes a subset of the cells. The method further includes determining a voltage budget for a tile, calculating a voltage drop for each cell of the subset of the cells of the tile based on determining an activity factor for the cell and a peak current consumed by the cell, determining, for each cell of the subset and based on the power grid, an affected vicinity for the cell including one or more neighboring cells affected by a current drawn on the cell, determining an affected vicinity for the tile based on the affected vicinity for each cell of the subset, calculating a voltage drop for the tile based on the voltage drop for each cell of the affected vicinity for the tile, and detecting a voltage deviation for the tile when a difference between the voltage budget for the tile and the voltage drop for the tile exceeds a pre-determined threshold.

Other aspects of the invention will be apparent from the following description and the appended claims.

DETAILED DESCRIPTION

Figure 1A:
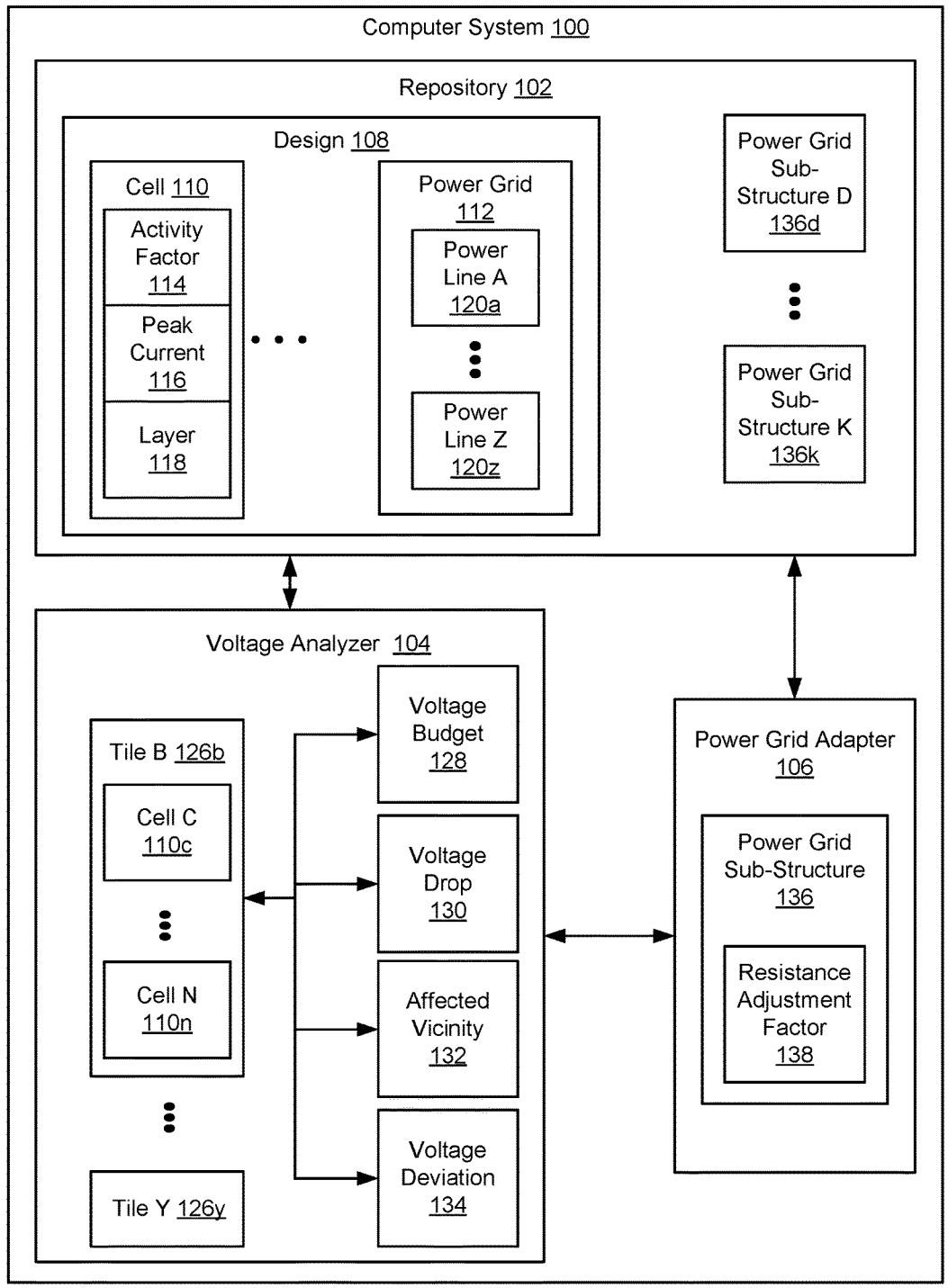
FIG. 1A and FIG. 1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention involve adapting a power grid for a design of an integrated circuit (i.e., a chip). In one or more embodiments of the invention, the design may be divided into tiles, where each tile includes a subset of cells of the design. A voltage budget may be determined for each tile, based on the technology used in the chip, which represents the maximum voltage drop that the tile may sustain without incurring degradation of performance. The voltage budget for a tile may be compared to a voltage drop for the tile, based on a voltage drop for each cell in an affected vicinity of the tile. A voltage drop may be determined for each cell based on determining an activity factor for the cell and a peak current consumed by the cell. The activity factor of a cell may be based on an expected number of elements of the cell switching on within a clock cycle. The affected vicinity may include neighboring cells affected by a voltage drop due to a current drawn on the cells of the tile. A voltage deviation may be detected when the voltage drop for the tile substantially deviates from the voltage budget for the tile. The voltage deviation may represent a voltage surplus when the calculated voltage drop substantially exceeds (i.e., overshoots) the voltage budget. The voltage deviation may represent a voltage deficit when the voltage drop is substantially below (i.e., undershoots) the voltage budget. Analyzing smaller tiles may facilitate the discovery of localized voltage deviations that may not be detected when tiles are described at a coarser level of granularity.

The power grid may be adapted to compensate for a voltage deficit in a tile by adding power lines to the power grid, in order to reduce the overall resistance of the power grid in the vicinity of the tile. Similarly, the power grid may be adapted to exploit a voltage surplus in a tile by removing power lines from the power grid. A library of power grid sub-structures may be developed to address different voltage deviation levels. Once verified, a power grid sub-structure may be leveraged to address voltage deviations in multiple chip designs.

FIG. 1A shows a system in accordance with one or more embodiments of the invention. As shown in FIG. 1A, the system includes a computer system (100) that includes a repository (102), a voltage analyzer (104), and a power grid adapter (106). In one or more embodiments, the computer system (100) may be the computing system (500) described with respect to FIG. 5A and the accompanying description below, or may be the client device (526) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a design (108) and power grid sub-structures (136d-136k). A design (108) may include cells (110) and a power grid (112). The design (108) may be represented at different levels of detail. In one or more embodiments, the design (108) may be a physical design (e.g., resulting from logic synthesis of a register-transfer-level (RTL) description). In one or more embodiments, a cell (110) may be a standard cell or any other element used in cell-based chip design (e.g., based on structured application-specific integrated circuits (ASICs), field-programmable gate arrays (FPGAs), and/or complex programmable logic devices (CPLDs)). In one or more embodiments, the structure of a cell (110) may be based on a RTL description. In one or more embodiments, each cell (110) may include an activity factor (114), a peak current (116), and a layer (118).

In one or more embodiments, an activity factor (114) represents a measure of predicted activity of the cell (110). The activity factor (114) may be based on a predicted number of elements within the cell (110) that may be simultaneously active at any given moment. For example, the activity factor (114) may be based on a predicted number of transistors in the cell (110) that may be switched on within a clock cycle of the cell (110). The activity factor (114) may represent the probability of a current being consumed by the cell (110). In one or more embodiments, the activity factor (114) may be based on an analysis of the design (108). Alternatively, the activity factor (114) may be based on a simulation of the design (108).

In one or more embodiments, a peak current (116) of a cell (110) may be based on the sharpest (e.g., worst case) input slew of each active pin of the cell (110), and the load (e.g., capacitance) driven by the cell (110). The input slew may be calculated as the change in voltage per unit of time. The peak current (116) of the cell (110) may also be based on the technology used in the design (108), which may constrain the capacity of the cell (108) to conduct current. For example, measurements obtained for a given technology (e.g., 14 nanometer technology) may indicate that devices based on the technology have high resistivity, which may affect the capability of those devices to conduct current. In one or more embodiments, the peak current (116) of the cell (110) may be replaced by an average current of the cell (110). In one or more embodiments, the peak current (116) of the cell (110) may be replaced by a pseudo-average current of the cell (110). In one or more embodiments, an average current of the cell (110) or a pseudo-average current of the cell (110) may be used instead of the peak current (116) of the cell (110).

In one or more embodiments, a layer (118) of a cell (110) is the metal (e.g., photolithography) layer of the design (108) that includes the cell (110). The number and types of layers (118) may be based on the fabrication technology used in the design (108). The fabrication technology may determine various characteristics (e.g., resistivity, metallization) of the layer (118). A layer (118) may be voltage drop-sensitive when the layer (118) is characterized by high resistivity. A voltage drop-sensitive layer (118) may be especially vulnerable to performance degradation due to voltage drops. For example, with some technologies, higher layers (118) may be characterized by low resistivity, in part due to the increased thickness and increased area of the higher layers (118). In one or more embodiments, simulations may be used to identify which layers (118) may be voltage drop-sensitive.

Continuing with FIG. 1A, in one or more embodiments, the power grid (112) may include power lines (120a-120z). Each power line (120a-120z) may be connected to one or more other power lines (120a-120z). For example, the power lines (120a-120z) may be connected in a grid formation. In one or more embodiments, each power line (120a-120z) may also be connected to one or more cells (110) (e.g., to supply a voltage to the cells (110)). A general design goal for the power grid (112) may be to make the power lines (120a-120z) as short as possible, while complying with various routing constraints. Another design goal may be to make the resistance of the power grid (112) as low as possible, to reduce the amount of potential voltage drops (130) due to the power grid (112).

A long power line (120a-120z) may be referred to as a rail. A short power line (120a-120z) may be referred to as a strap.

A strap may connect two rails. A rail may be connected to multiple straps. In one or more embodiments, the use of straps increases the number of contact points among the power lines (120a-120z) of the power grid (112). For example, a power grid (112) consisting only of rails may have few points of contact between the rails due to the need to avoid crossing (e.g., shorting) the rails. In contrast, using straps permits a large number of short, unobstructed paths between rails.

In one or more embodiments, a power line (120a-120z) with positive polarity is referred to as "power" and a power line (120a-120z) with negative polarity is referred to as "ground".

Figure 1B:
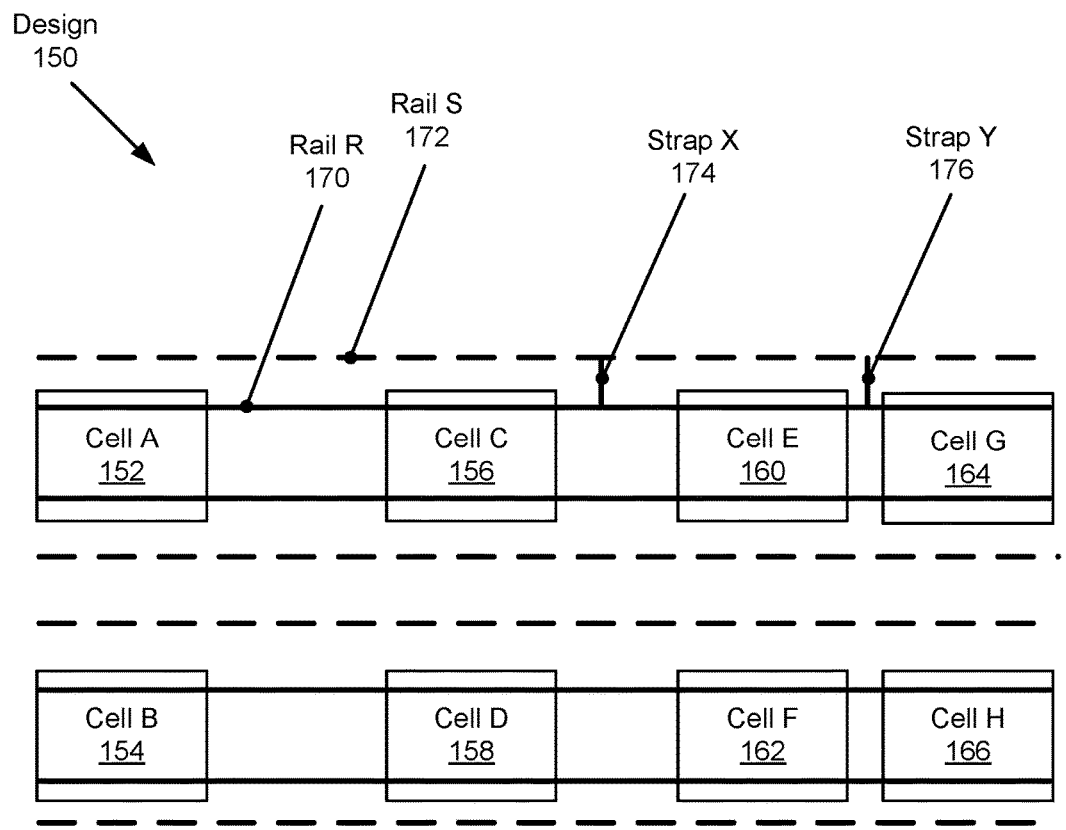

FIG. 1B shows a non-limiting example of a design (150). The various rails and straps in the design (150) distribute power to the various cells (152, 154, 156, 158, 160, 162, 164, 166) of the design (150). In FIG. 1B, cell A (152), cell C (156), cell E (160), and cell G (164) receive a voltage from rail R (170). Rail S (172) is shown as a dashed line to indicate that rail S (172) is located at a different layer of the design from the layer at which rail R (170) is located. In FIG. 1B, power flows between rail R (170) and rail S (172) via strap X (174) and strap Y (176).

Returning to FIG. 1A, in one or more embodiments, the voltage analyzer (104) may be implemented in hardware (e.g., circuitry), software, or any combination thereof. In one or more embodiments, the voltage analyzer (104) includes functionality to divide a design (108) into tiles (126b-126y). In one or more embodiments, each tile (126b-126y) includes one or more cells (110c-110n). In one or more embodiments, the cells (110c-110n) in a tile (126b-126y) may be at the same layer (118) of the design (108). In one or more embodiments, the size of a tile (126b-126y) may be based on the size and level of detail of the cells (110c-110n).

In one or more embodiments, the tiles (126b-126y) have uniform dimensions (e.g., to simplify the grouping of cells (110c-110n) into tiles (126b-126y)). In one or more embodiments, the tiles (126b-126y) have non-uniform dimensions. In one or more embodiments, the shape of each tile (126b-126y) may be a square. In one or more embodiments, the shape of each tile (126b-126y) is a rectangle or some other polygon. The dimensions of a tile (126b-126y) may be based on a technology used in the design (108). The dimensions of a tile (126b-126y) may also be based on a dimension of a cell (110c-110n). In one or more embodiments, the dimensions of a tile (126b-126y) may be based on a distance between layers (118), such as the top two layers (118) of the design (108). In one or more embodiments, the dimensions of a tile (126b-126y) may be based on a pitch of one or more layers (118) of the design (108). In one or more embodiments, the dimensions of a tile (126b-126y) may depend, in part, on the voltage drop sensitivity (e.g., due to the resistivity) of one or more layers (118) of the design (108).

Continuing with FIG. 1A, in one or more embodiments, the voltage analyzer (104) includes functionality to determine a voltage budget (128) for a tile (126b-126y). The voltage budget (128) may indicate a maximum voltage drop that the tile (126b-126y) may sustain without incurring degradation of performance and/or reliability. The voltage budget (128) may be based, in part, on the technology used in the design (108). For example, the voltage budget (128) may be based on the resistivity of wires using a specific technology. In one or more embodiments, the voltage budget (128) may be based on a peak current supported by a specific technology. In one or more embodiments, the voltage budget (128) may be based on simulations, analyses, and/or measurements of the performance of the technology used in the design (108). The voltage budget (128) may also be based, in part, on the structure of the power grid (112).

In one or more embodiments, the voltage analyzer (104) includes functionality to calculate a voltage drop (130) for a tile (126b-126y). The voltage drop (130) for the tile (126b-126y) may be based on the voltage drops (130) for each cell (110c-110n) of the tile (126b-126y). For example, the voltage drop (130) of the tile may be due to currents drawn by the various devices (e.g., transistor gates) included in the cells (110c-110n) of the tile (126b-126y). The voltage drop (130) of the tile may also be due to currents drawn by the various devices included in the cells (110c-110n) of one or more neighboring tiles (126b-126y).

In one or more embodiments, the voltage analyzer (104) includes functionality to detect an affected vicinity (132) for a tile (126b-126y). The affected vicinity (132) for the tile (126b-126y) may be based on the affected vicinities (132) for each cell (110c-110n) of the tile (126b-126y). The affected vicinity (132) of a cell (110c-110n) may include one or more neighboring cells (110c-110n) affected by a voltage drop (130) due to a current drawn on the cell (110c-110n). In one or more embodiments, the affected vicinity (132) of a cell (110c-110n) may include neighboring cells (110c-110n) located at a layer (118) different from the layer (118) of the cell (110c-110n).

Continuing with FIG. 1A, in one or more embodiments, a tile (126b-126y) may have a corresponding voltage deviation (134). Each voltage deviation (134) may represent a deviation, relative to a pre-determined threshold, of a voltage drop (130) for the tile (126b-126y) relative to a voltage budget (128) for the tile (126b-126y). The threshold may indicate a level of deviation above which the deviation is considered to be significant (i.e., the deviation is not within a margin of error).

In one or more embodiments, the voltage deviation (134) may be expressed as a percentage. For example, a voltage deviation (134) may be expressed as a 5% deviation, indicating that the voltage drop (130) for the tile (126b-126y) exceeds the voltage budget (128) for the tile (126b-126y) by 5%. Alternatively, the voltage deviation (134) may be expressed as an absolute voltage. For example, a voltage deviation (134) may be expressed as deviation of 500 millivolts, indicating that the voltage drop (130) for the tile (126b-126y) exceeds the voltage budget (128) for the tile (126b-126y) by 500 millivolts. A voltage deviation (134) may represent a voltage deficit when the voltage drop (130) for the tile (126b-126y) exceeds the voltage budget (128) for the tile (126b-126y). A voltage deviation (134) may represent a voltage surplus when the voltage budget (128) for the tile (126b-126y) exceeds the voltage drop (130) for the tile (126b-126y).

In one or more embodiments, the voltage analyzer (104) includes functionality to send one or more voltage deviations (134) to the power grid adapter (106).

In one or more embodiments, deviations due to differences between other types of power-related budgets and power-related drops may be analyzed. For example, a tile (126b-126y) may have a corresponding inductive deviation (not shown) due to a difference between an inductive budget for the tile and an inductive drop of the tile. That is, in one or more embodiments, detecting inductive deviations may be performed similarly to detecting voltage deviations (134).

Continuing with FIG. 1A, the power grid adapter (106) may be implemented in hardware (e.g., circuitry), software, or any combination thereof. In one or more embodiments, the power grid adapter (106) includes functionality to adapt a power grid (112) using a power grid sub-structure (136).

The power grid sub-structure (136) may be a portion of a power grid (112). In one or more embodiments, the power grid adapter (106) includes functionality to add a power grid sub-structure (136) to the power grid (112) to address a voltage deviation (134) for a tile (126b-126y) (e.g., to reduce a voltage deficit). In one or more embodiments, the power grid adapter (106) includes functionality to receive the voltage deviation (134) from the voltage analyzer (104).

In one or more embodiments, the power grid adapter (106) includes functionality to remove a power grid sub-structure (136) from the power grid (112) to address a voltage deviation (134) for a tile (126b-126y) (e.g., to reduce a voltage surplus).

The power grid sub-structure (136) may have a resistance adjustment factor (138) that describes the amount by which the power grid sub-structure (136) adjusts the resistance of the power grid (112). In one or more embodiments, the resistance adjustment factor (138) may be expressed in terms of a percentage. For example, when a power grid sub-structure (136) with a resistance adjustment factor (138) of 5% is added to the power grid (112), then the resistance of the power grid (112) may be reduced by 5%. In one or more embodiments, reducing the resistance of the power grid (112) may proportionally reduce the voltage drop (130) due to the resistance of the power grid (112). In one or more embodiments, the resistance adjustment factor (138) may have an associated margin of error. For example, if the resistance adjustment factor (138) is 5%, and the associated margin of error is 10%, then the corresponding power grid sub-structure (136) may adjust the resistance of the power grid (112) by between 4.5% and 5.5%.

In one or more embodiments, the power grid adapter (106) includes functionality to add a power grid sub-structure (136d-136k) to the repository (102). The repository (102) may therefore include a library of power grid sub-structures (136d-136k) that may be used in a power grid (112) to address various levels of voltage deviations (134) via various levels of resistance adjustment factors (138). For example, the repository (102) may include analyzed and verified power grid sub-structures (136d-136k) associated with resistance adjustment factors (138) of 2%, 5%, 7%, 10%, 15%, 20%, etc.

In one or more embodiments, the power grid adapter (106) includes functionality to retrieve a power grid sub-structure (136d-136k) from the repository (102). In one or more embodiments, the power grid sub-structure (136d-136k) may be retrieved based on the resistance adjustment factor (138) associated with the power grid sub-structure (136d-136k).

While FIG. 1A shows a configuration of components, other configurations may be used without departing from the scope of the invention. For example, various components may be combined to create a single component. As another example, the functionality performed by a single component may be performed by two or more components.

Figure 2:
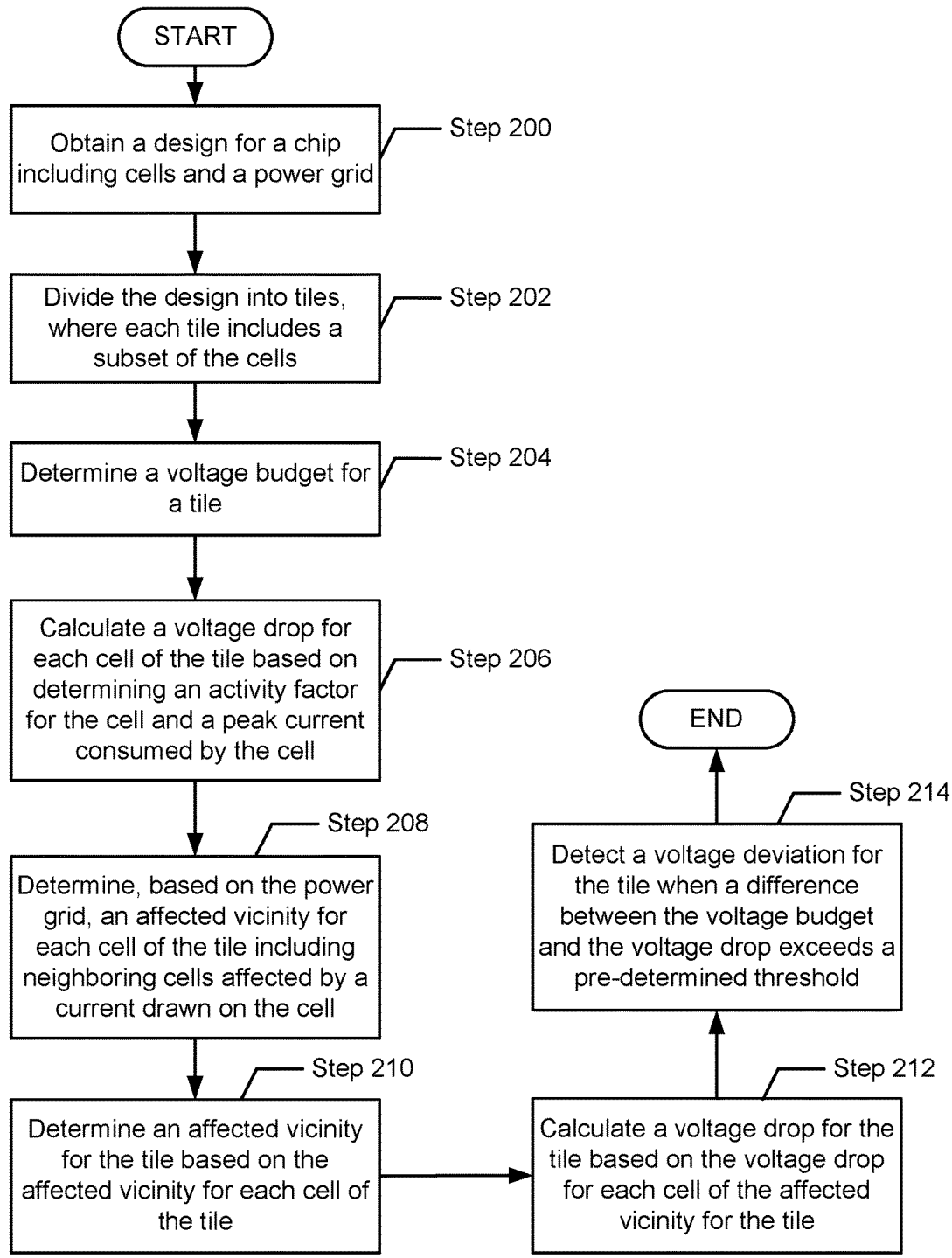
FIG. 2 and FIG. 3 show flowcharts in accordance with one or more embodiments of the invention.

FIG. 2 shows a flowchart in accordance with one or more embodiments of the invention. The flowchart depicts a process for analyzing a design of a chip. One or more of the steps in FIG. 2 may be performed by the components (e.g., the voltage analyzer (104)) of the computer system (100), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a design for a chip that includes cells and a power grid is obtained. The design may be obtained from a repository. In one or more embodiments, a cell may be a standard cell or any other element used in cell-based chip design. In one or more embodiments, the structure of a cell may be based on a RTL description. Each cell may be located at a metal (e.g., photolithography) layer of the design. In one or more embodiments, the power grid includes interconnected power lines. Each power line may be connected to one or more cells (e.g., to supply a voltage to the cells).

In Step 202, the design is divided into tiles. Each tile may include a subset of the cells. The size of a tile may be based on a technology used in the design. In one or more embodiments, the size of a tile may be based on a distance between layers of the design. In one or more embodiments, dividing the design into tiles provides the advantage of decomposing the analysis of the design into a series of smaller, localized tile-based analyses. In one or more embodiments, the tile size may be as close as possible to the size of a cell.

In Step 204, a voltage budget is determined for a tile. The voltage budget may indicate a maximum voltage drop that the tile may sustain without incurring degradation of performance and/or reliability. The voltage budget may be based on the technology used in the design, for example, based on simulations, analyses, and performance measurements of the technology used in the design. In one or more embodiments, the voltage budget may be based on a peak current supported by a specific technology (e.g., due to the resistivity of wires using the technology). The voltage budget may also be based on the structure of the power grid.

In Step 206, a voltage drop is calculated for each cell of the tile based on determining an activity factor for the cell and a peak current consumed by the cell. The peak current consumed by the cell may be based on the sharpest input slew of each active pin of the cell, and the load driven by the cell. The input slew may be calculated as the change in voltage per unit of time.

The activity factor may represent a measure of predicted activity of the cell. The activity factor may be based on a predicted number of elements within the cell that may be simultaneously active at any given moment. The activity factor therefore may represent the probability of a current being consumed by the cell. In one or more embodiments, the voltage drop for the cell may be calculated by multiplying the peak current consumed by the cell by the activity factor of the cell and the resistance of the power grid in the vicinity of the cell.

In Step 208, an affected vicinity for each cell of the tile is determined, based on the power grid. The affected vicinity may include one or more neighboring cells affected by a voltage drop due to a current drawn on the cell of the tile. In one or more embodiments, the neighboring cells may be at a layer different from the layer of the cell of the tile. For example, cells at a specific layer may be voltage drop-sensitive when the layer is characterized by high resistivity.

In one or more embodiments, the effect on a neighboring cell may taper off as the distance between the neighboring cell and the cell of the tile increases. For example, the effect on neighboring cells may be expressed by an attenuation function of the distance between the neighboring cell and the cell of the tile, such as a normal distribution or Gaussian distribution.

In one or more embodiments, the affected vicinity for the cell of the tile may depend on the structure of the power grid. For example, the affected vicinity for the cell of the tile may depend on the continuity of the power grid. In a non-limiting scenario where the cell of the tile is powered by horizontal parallel rails, then the neighboring cells may also be found horizontally (e.g., to the left and the right of the cell of the tile). That is, when the power grid, and therefore the current flow, is continuous in just one (e.g., the horizontal) direction, then the affected cells may also be found as current flows along a single coordinate axis. This scenario is illustrated in FIG. 1B, where the various cells are powered by horizontal rails. In contrast, in a scenario where the cell is powered by both horizontal and vertical rails, then the neighboring cells may be found both horizontally and vertically. That is, when the power grid is continuous in multiple directions, then the affected cells may also be found along multiple coordinate axes.

In Step 210, an affected vicinity for the tile is determined based on the affected vicinities for each cell of the tile. For example, the affected vicinity for the tile may be the aggregation of the affected vicinities for each cell of the tile. In one or more embodiments, the collection of affected vicinities for the tiles of a design represents a voltage drop roadmap for the design (e.g., a roadmap that may be useful for a power grid designer).

In Step 212, a voltage drop is calculated for the tile based on the voltage drop for each cell of the affected vicinity for the tile. For example, the voltage drop for the tile may be the sum of the voltage drops for each cell of the affected vicinity of the tile. Alternatively, the voltage drop for the tile may be the maximum of the voltage drops for the cells of the affected vicinity of the tile.

In Step 214, a voltage deviation is detected for the tile when a difference between the voltage budget for the tile and the voltage drop for the tile exceeds a pre-determined threshold. The voltage deviation may be expressed as a percentage. The voltage deviation may represent a voltage deficit when the voltage drop for the tile exceeds the voltage budget for the tile. A voltage deviation may represent a voltage surplus when the voltage budget for the tile exceeds the voltage drop for the tile. If the difference between the voltage budget for the tile and the voltage drop for the tile does not exceed the pre-determined threshold, then the deviation is not considered to be significant (i.e., the deviation may be within the margin of error).

Those skilled in the art, and having the benefit of this Detailed Disclosure, will understand that Step 204, Step 206, Step 208, Step 210, Step 212 and Step 214, of FIG. 2 may be executed for each tile identified in Step 202. Alternatively, in one or more embodiments, the execution of Step 204, Step 206, Step 208, Step 210, Step 212 and Step 214, of FIG. 2 may be limited to tiles identified in Step 202 that include one or more added, modified, and/or deleted cells. That is, the process of FIG. 2 may be applied in an incremental mode, to focus the analysis on the changed aspects of an existing design.

In one or more embodiments, the method of FIG. 2 may be performed multiple times as the design is refined. Each successive design refinement may enable the tile size to be decreased. For example, analyzing smaller tiles may facilitate the discovery of localized voltage deviations that may not be detected when tiles are described at a coarser level of granularity.

Figure 3:
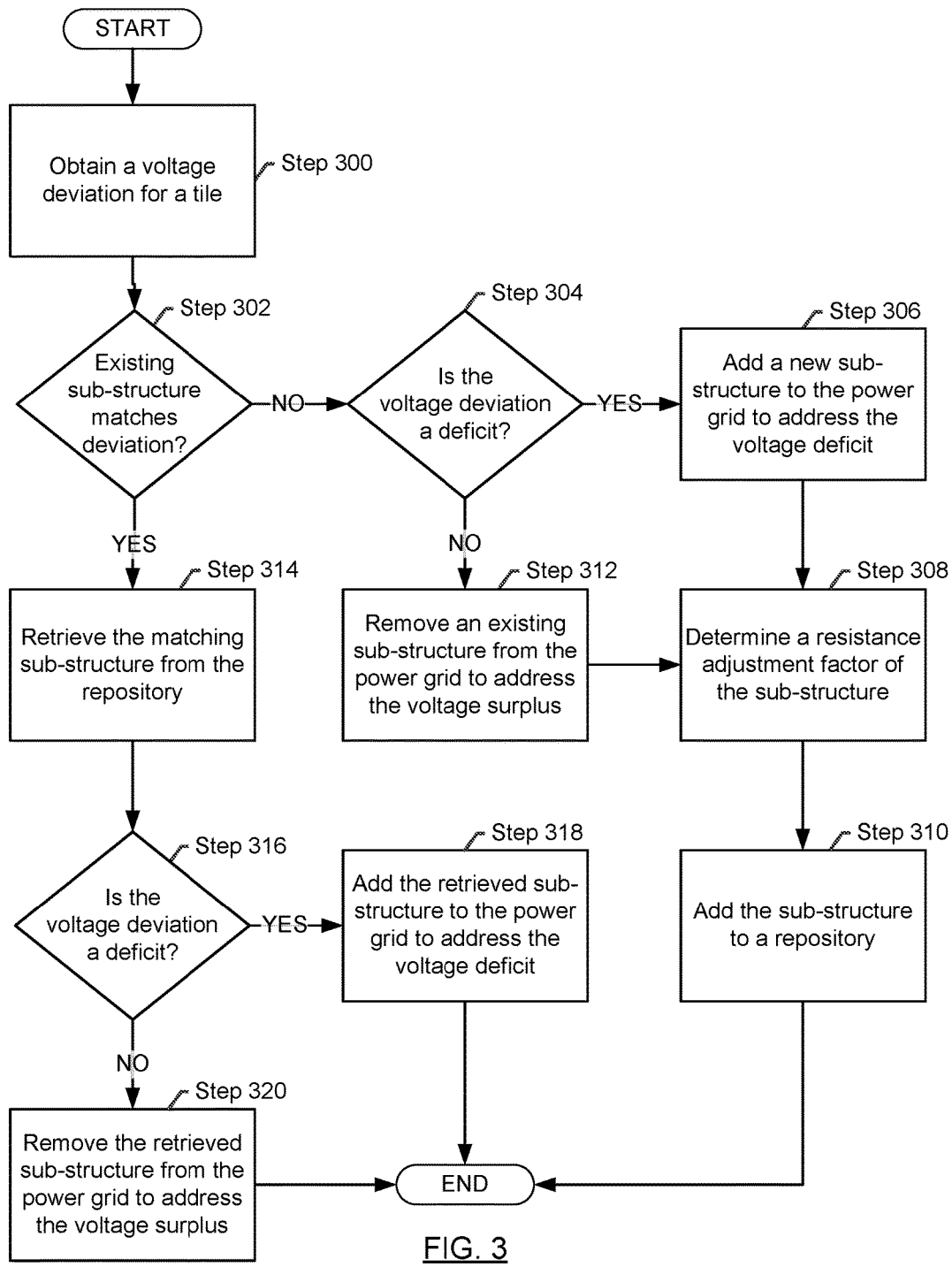

FIG. 3 shows a flowchart in accordance with one or more embodiments of the invention. The flowchart depicts a process for adapting a power grid. One or more of the steps in FIG. 3 may be performed by the components (e.g., the power grid adapter (106)) of the computer system (100), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, a voltage deviation is obtained for a tile. In one or more embodiments, the voltage deviation is obtained (e.g., from the voltage analyzer of FIG. 1A) as a result of performing Step 214 above.

In Step 302, it is determined whether an existing power grid sub-structure matches the voltage deviation. In one or more embodiments, the power grid sub-structure is retrieved from a repository. In one or more embodiments, the power grid sub-structure matches (e.g., within a margin of error) the voltage deviation when a resistance adjustment factor associated with the power grid sub-structure matches the voltage deviation. In one or more embodiments, the resistance adjustment factor describes an amount by which the power grid sub-structure adjusts the resistance of the power grid.

If Step 302 determines that no existing power grid sub-structure matches the voltage deviation, then in Step 304, it is determined whether the voltage deviation is a voltage deficit.

If Step 304 determines that the voltage deviation is a voltage deficit, then in Step 306, a new power grid sub-structure is added to the power grid to address the voltage deficit. In one or more embodiments, adding the new power grid sub-structure to the power grid may provide new power lines in parallel with the existing power lines of the power grid that reduce the resistance of the power grid. In one or more embodiments, adding the new power grid sub-structure to the power grid may reduce the voltage drop for the tile to be within the voltage budget for the tile, within the predetermined threshold, thereby eliminating the voltage deficit. In one or more embodiments, the new power grid sub-structure includes power lines located at multiple layers of the design.

In Step 308, a resistance adjustment factor is determined for the power grid sub-structure. In one or more embodiments, the resistance adjustment factor may describe the effect of the new power grid sub-structure on the resistance of the power grid. In one or more embodiments, the resistance adjustment factor may be based on simulations and measurements performed on the new power grid sub-structure.

In Step 310, the new power grid sub-structure is added to a repository. The resistance adjustment factor associated with the new power grid sub-structure may be used to match the new power grid sub-structure to other voltage deviations (e.g., when performing Step 302 above). The repository thus may include a library of analyzed and debugged power grid sub-structures that may be quickly and reliably adapted to address voltage deviations in other designs.

If Step 304 determines that the voltage deviation is not a voltage deficit, then in Step 312, an existing power grid sub-structure is removed from the power grid to address the voltage surplus. That is, the voltage surplus represents an opportunity to streamline the power grid by removing power lines, without exceeding the voltage budget for the tile. Execution then continues with Step 308 and Step 310 above.

If Step 302 above determines that an existing power grid sub-structure matches the voltage deviation, then Step 314 is performed to retrieve the matching power grid sub-structure from the repository.

If Step 316 determines that the voltage deviation is a voltage deficit, then in Step 318, the retrieved power grid sub-structure is added to the power grid to address the voltage deficit (see description of Step 306 above).

If Step 316 above determines that the voltage deviation is not a voltage deficit, then in Step 320 the retrieved power grid sub-structure is removed from the power grid to address the voltage surplus (see description of Step 312 above).

Figure 4A:
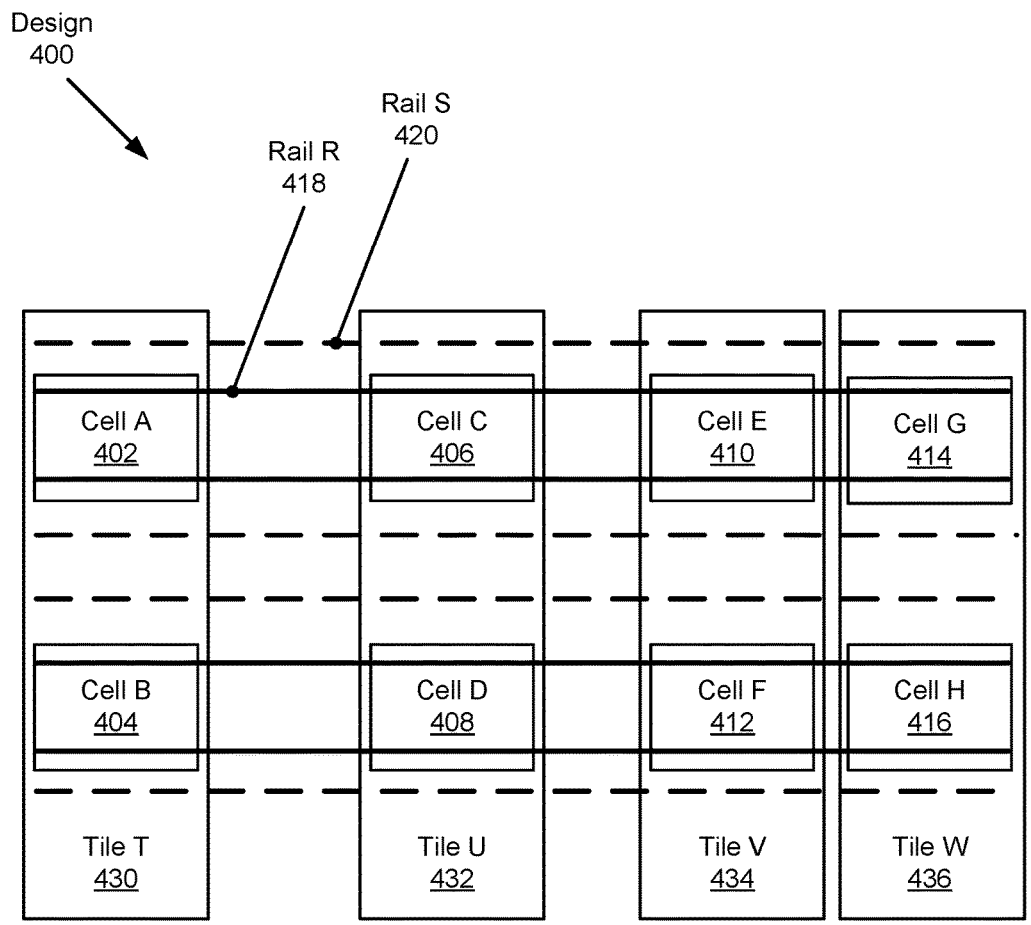
FIG. 4A, FIG. 4B, FIG. 4C and FIG. 4D show examples in accordance with one or more embodiments of the invention.

The following example is for explanatory purposes only and not intended to limit the scope of the invention. FIG. 4A, FIG. 4B, FIG. 4C, and FIG. 4D show an implementation example in accordance with one or more embodiments of the invention. FIG. 4A shows a design (400) that includes cells (402, 404, 406, 408, 410, 412, 414, 416). The design (400) is divided into four tiles (430, 432, 434, 436), each including two cells. The design (400) uses a specific technology (e.g., 14 nanometer technology). The design (400) also includes a power grid that includes power lines, including rail R (418) and rail S (420). Rail R (418), drawn as a solid line, is located at the same layer of the design (400) as the cells (402, 404, 406, 408, 410, 412, 414, 416). In contrast, rail S (420), drawn as a dashed line, is located at a different layer of the design (400) from rail R (418) and the cells (402, 404, 406, 408, 410, 412, 414, 416).

When analyzing (e.g., by the voltage analyzer (104) of FIG. 1A) the design (400) to detect voltage deviations, each tile (430, 432, 434, 436) may be analyzed. The example shown in FIG. 4A, FIG. 4B, FIG. 4C, and FIG. 4D focuses on tile V (434). A voltage budget of 250 millivolts is determined for tile V (434) based on a peak current that may be supported by tile V (434) without incurring performance degradation. The voltage budget is derived, in part, from simulations, analyses, and/or measurements of the performance of the technology used in the design (400). The voltage budget for tile V (434) may impose a limit on the current that may flow through tile V (434) without causing a voltage deviation relative to the voltage budget for tile V (434). For example, a relative magnitude of the voltage drop for tile V (434) may be calculated based on multiplying the current through tile V (434) by the resistance due to the power grid.

The voltage drop for tile V (434) is calculated based on the voltage drop for each cell (410, 412) of tile V (434). The voltage drop for each cell (410, 412) of tile V (434) is based on the activity factor for the cell and a peak current consumed by the cell. It is determined, based on simulations of the design (400), that cell E (410) may consume a peak current of 30 milliamps and cell F (412) may consume a peak current of 40 milliamps. It is also determined, based on simulations of the design (400), that cell E (410) has an activity factor of 0.7 and cell F (412) has an activity factor of 0.4. For example, cell F (412) may contain several devices that are not active in the standard operating mode of the design (400). The resistance of the power grid in the vicinity of tile V (434) is measured at 5 ohms. The voltage drop for cell E (410) is calculated based on the peak current, the activity factor, and the resistance.

Figure 4B:
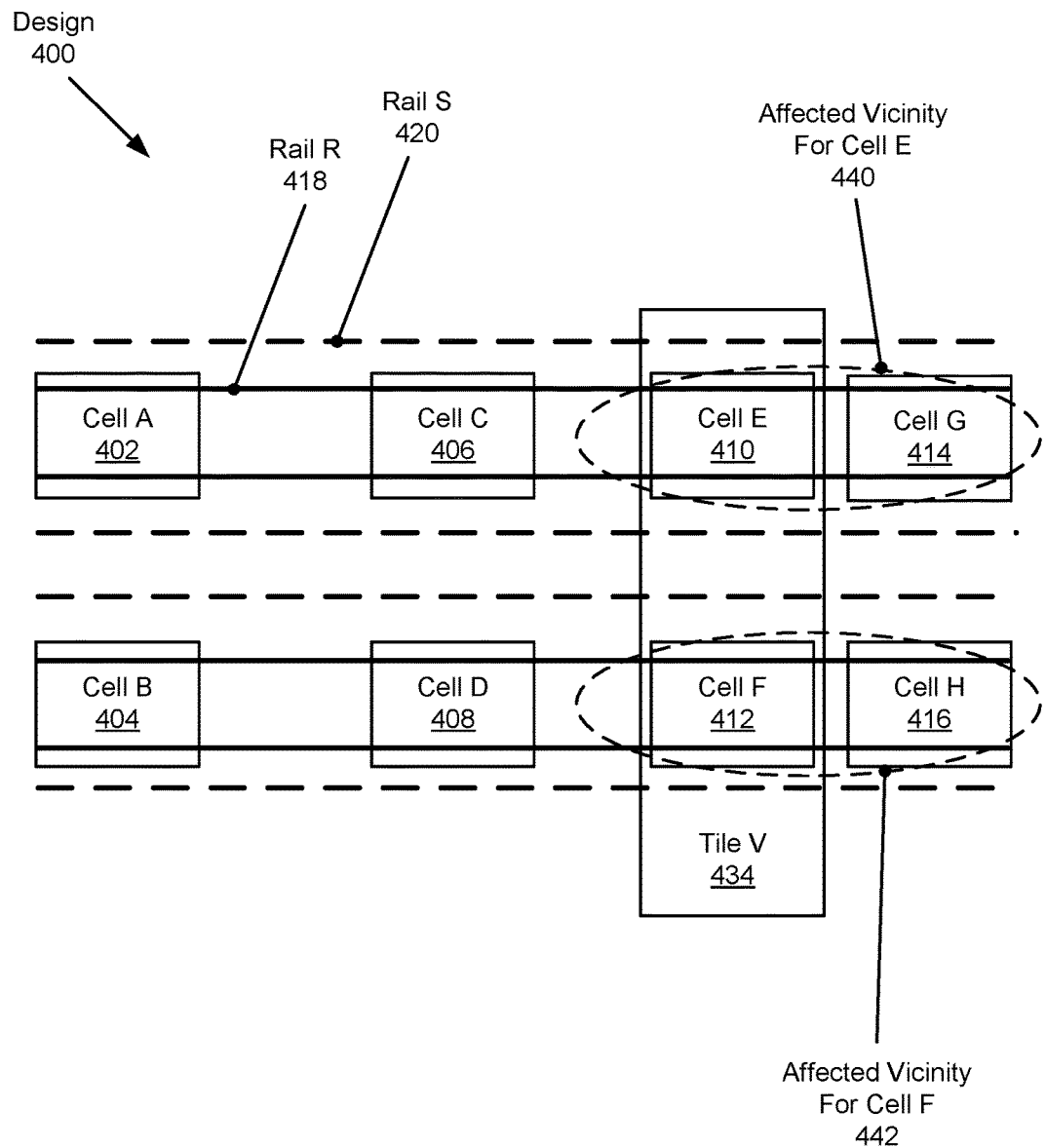

Next, the affected vicinities (440, 442) for the cells (410, 412) of tile V (434) are determined, as shown in FIG. 4B. The affected vicinity (440, 442) for a cell (410, 412) includes neighboring cells (414, 416) affected by a voltage drop due to a current drawn on the cell. The affected vicinity may depend on the continuity of the power grid of the design (400) as current flows along one or more coordinate axes. For example, in FIG. 4B, the power lines (e.g., rail R (418)) of the power grid are continuous only in the horizontal direction. Therefore, the affected vicinity (440, 442) of the cells (410, 412) of tile V (434) includes neighboring cells (414, 416) in the horizontal direction (i.e., along the x-axis), but does not include neighboring cells in the vertical direction. That is, if the power grid also included power lines that were continuous in the vertical direction (i.e., along the y-axis), the affected vicinities would also include neighboring cells in the vertical direction. In addition, if a particular layer of the design (400) is voltage drop-sensitive (e.g., due to high resistivity of the layer), then the affected vicinities might also include neighboring cells in the voltage drop-sensitive layer (e.g., along the z-axis).

In FIG. 4B, the affected vicinity (440) for cell E (410) includes cell G (414), and the affected vicinity (442) for cell F (412) includes cell H (416). However, the effect of the current drawn on the cells (410, 412) of tile V (434) tapers off as the distance to neighboring cells increases. Therefore, the currents drawn on cell E (410) and cell F (412) do not affect cell C (406) or cell D (408). For example, the effect of the current drawn on cell E (410) of tile V (434) may be modeled via a normal distribution centered around cell E (410) that tapers off before reaching cell C (406).

The affected vicinity for tile V (434) includes the affected vicinities (440, 442) of the cells (410, 412) of tile V (434). The voltage drop for tile V (434) includes the voltage drops for the cells in the affected vicinities (440, 442) of the cells (410, 412) of tile V (434). Therefore, the voltage drop for tile V (434) includes the voltage drops for cell E (410), cell F (412), cell G (414), and cell H (416). The deviation between the calculated voltage drop for tile V (434) and the voltage budget for tile V (434) creates a voltage deficit, relative to a predetermined threshold.

Next, the power grid of the design (400) is adapted (e.g., by the power grid adapter (106) of FIG. 1A) to address the voltage deficit. First, an attempt is made to leverage an existing power grid sub-structure with lower resistance that may be added to the power grid to address the voltage deficit. A repository is searched for a power grid sub-structure with a resistance adjustment factor sufficient to bring the voltage drop for tile V (434) within the voltage budget for tile V (434). However, no power grid sub-structure in the repository has a resistance adjustment factor sufficient to eliminate the voltage deficit.

Figure 4C:
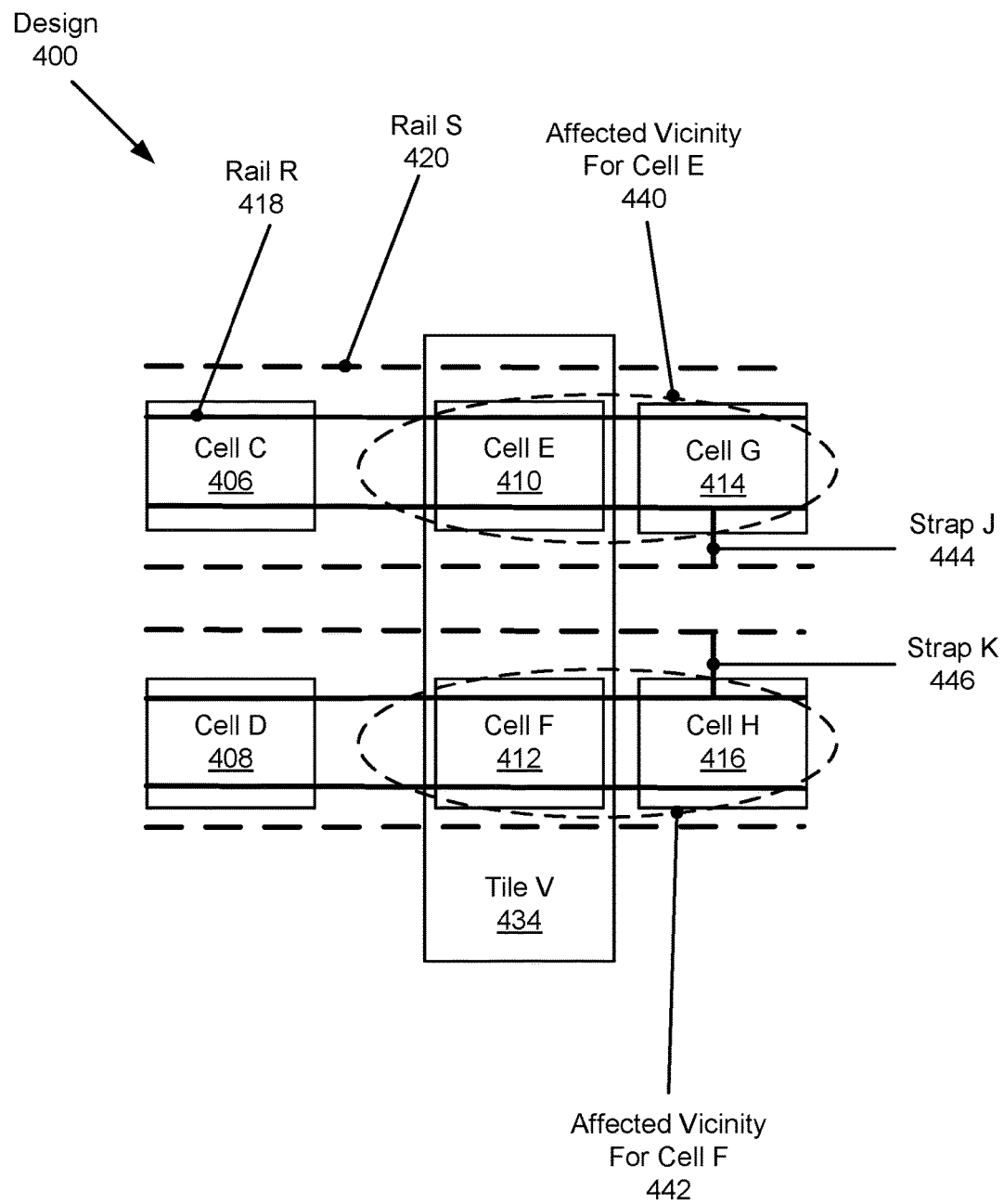

A new power grid sub-structure is then generated, and added to the power grid. The new power grid sub-structure includes strap J (444) and strap K (446), as shown in FIG. 4C. The new power grid sub-structure creates new parallel current flows that reduce the resistance of the power grid by the required resistance adjustment factor (e.g., within an acceptable margin of error), thereby eliminating the voltage deficit. The new power grid sub-structure is then added to the repository so that it may be used to address subsequent voltage deviations (e.g., whether voltage deficits or voltage surpluses) consistent with the resistance adjustment factor.

Alternatively, if the affected vicinity of tile V (434) had included neighboring cells at more than one layer of the design (400), then the new power grid sub-structure might also have included new power lines at multiple layers of the design (400).

Figure 4D:
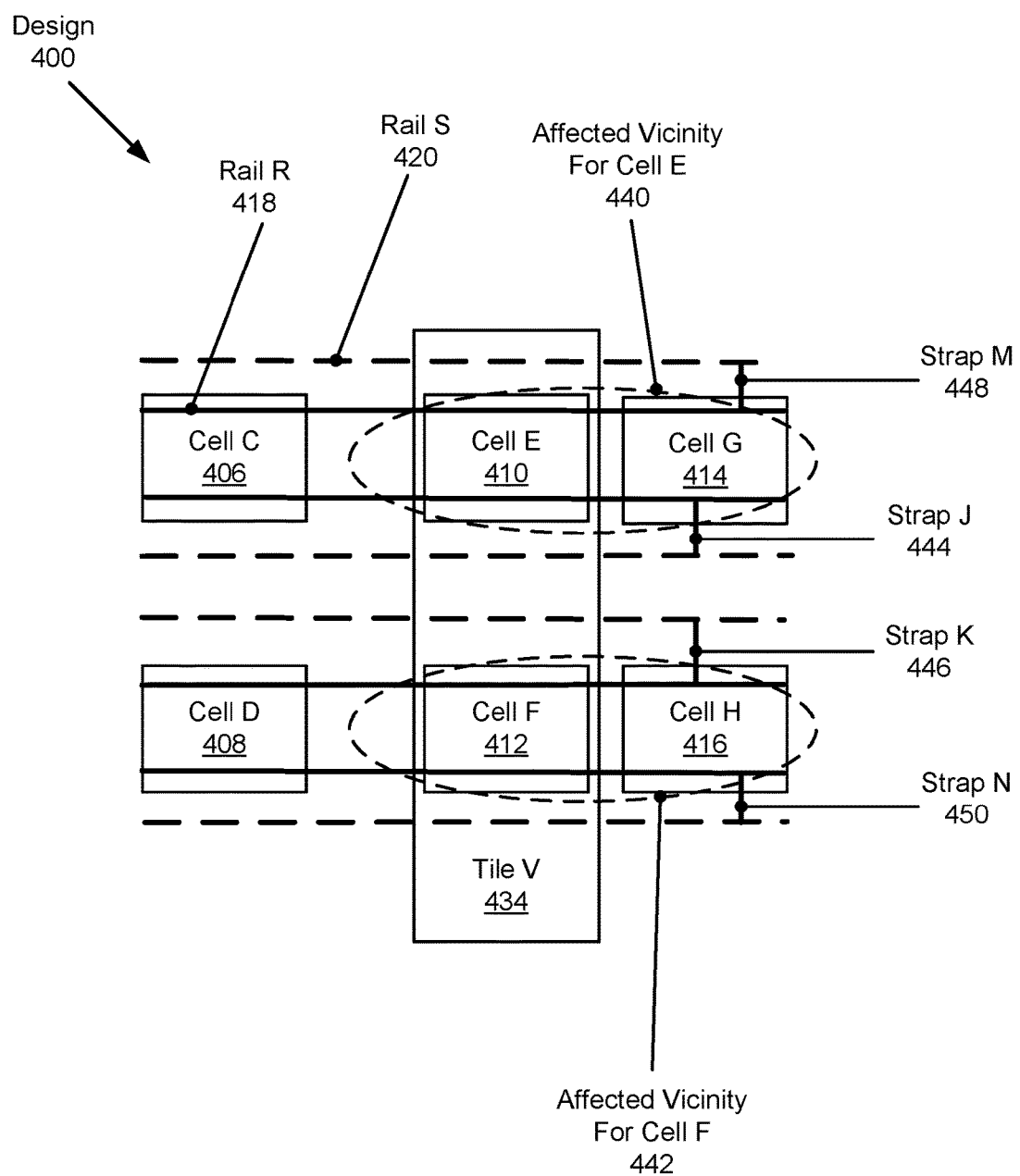

FIG. 4D shows a scenario where a second power grid sub-structure that includes strap M (448) and strap N (450) has been added to the power grid of the design (400). In this scenario, a simplifying change to the design (400) has created a voltage surplus in tile V (434), where cell E (410) has been streamlined by eliminating several devices (e.g., transistors). As a result, cell E (410) is sparsely populated with devices and now only consumes a peak current of 5 milliamps, instead of the previous peak current of 30 milliamps. An attempt is then made to exploit the resulting voltage surplus in tile V (434) by removing a power grid sub-structure from the power grid of the design (400). That is, it may be desirable to streamline the power grid so that the voltage drop for tile V (434) is brought within the voltage budget for tile V (434), within the predetermined threshold.

It is then determined that removing the second power grid sub-structure that includes strap M (448) and strap N (450) has a resistance adjustment factor that matches the new voltage surplus (e.g., within a margin of error). Alternatively, the repository may be searched for a power grid sub-structure that is also present in the power grid of the design (400) whose resistance adjustment factor matches the new voltage surplus. An advantage of retrieving a power grid sub-structure from the repository is that the power grid sub-structure in the repository has already been analyzed and verified, which may increase the likelihood of a reliable outcome (e.g., an outcome that does not cause new unforeseen problems).

Figure 5A:
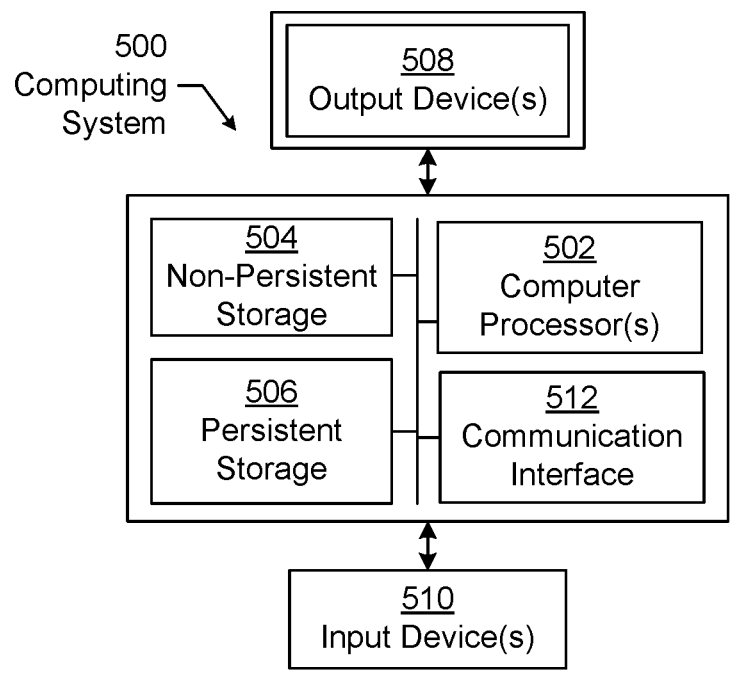
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
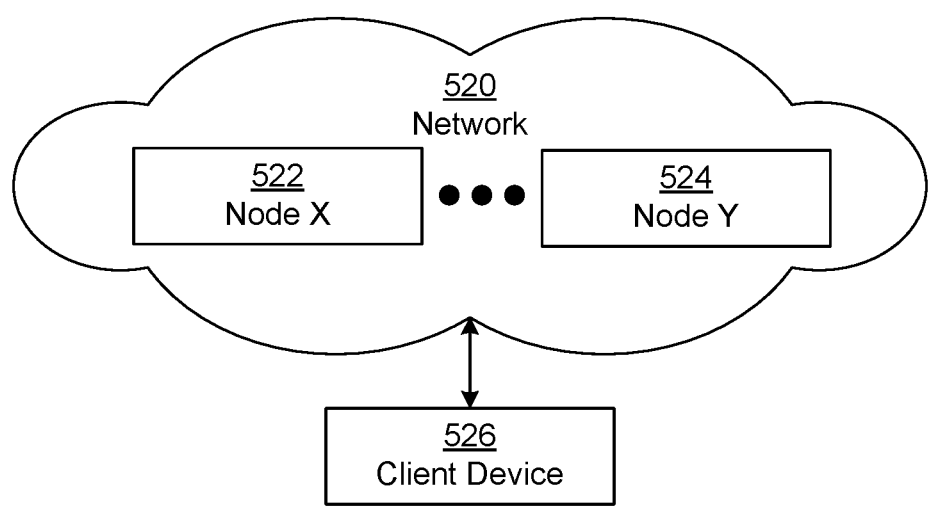

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    obtaining a design for a chip comprising a plurality of cells and a power grid comprising a plurality of power lines, wherein each cell of the plurality of cells is located at a layer of a plurality of layers;
    dividing the design into a plurality of tiles, each tile of the plurality of tiles comprising a subset of the plurality of cells;
    determining a voltage budget for a tile of the plurality of tiles;
    measuring resistivity for a fabrication technology used in the design;
    determining, using the measured resistivity, a peak current consumed by each cell of the subset of the plurality of cells of the tile;
    calculating a voltage drop for each cell of the subset of the plurality of cells of the tile based on determining an activity factor for the cell and the peak current consumed by the cell;
    determining, for each cell of the subset and based on the power grid, an affected vicinity for the cell comprising one or more neighboring cells of the plurality of cells affected by a current drawn on the cell;
    determining an affected vicinity for the tile based on the affected vicinity for each cell of the subset;
    calculating a voltage drop for the tile based on the voltage drop for each cell of the affected vicinity for the tile; and
    detecting a voltage deviation for the tile when a difference between the voltage budget for the tile and the voltage drop for the tile exceeds a pre-determined threshold.

2. The method of claim 1, further comprising:
    adding a power grid sub-structure to the power grid to address the voltage deviation, wherein the power grid sub-structure comprises one or more new power lines, wherein the voltage deviation represents a voltage deficit.

3. The method of claim 2, further comprising:
    determining a resistance adjustment factor for the power grid sub-structure, wherein the resistance adjustment factor describes an amount by which the power grid sub-structure adjusts the resistance of the power grid; and
    adding the power grid sub-structure to a repository.

4. The method of claim 3, further comprising:
    retrieving the power grid sub-structure from the repository based on matching the voltage deviation to the resistance adjustment factor.

5. The method of claim 1, further comprising:
    removing a power grid sub-structure from the power grid to address the voltage deviation, wherein the power grid sub-structure comprises one or more power lines of the plurality of power lines, wherein the voltage deviation represents a voltage surplus.

6. The method of claim 1, wherein determining the activity factor for the cell comprises:
    determining an expected number of elements of the cell switching on within a clock cycle of the cell.

7. The method of claim 1, wherein determining the affected vicinity of the cell comprises:
    determining a voltage-sensitive layer of the plurality of layers at which a current draw of the cell affects a neighboring cell of the plurality of cells, wherein the neighboring cell is located at the voltage-sensitive layer.

8. A system, comprising:
    a design for a chip comprising a plurality of cells and a power grid comprising a plurality of power lines, wherein each cell of the plurality of cells is located at a layer of a plurality of layers;
    a repository comprising the design; and
    a voltage analyzer configured to:
        divide the design into a plurality of tiles, each tile of the plurality of tiles comprising a subset of the plurality of cells;
        determine a voltage budget for a tile of the plurality of tiles;
        measure resistivity for a fabrication technology used in the design;
        determine, using the measured resistivity, a peak current consumed by each cell of the subset of the plurality of cells of the tile;
        calculate a voltage drop for each cell of the subset of the plurality of cells of the tile based on determining an activity factor for the cell and the peak current consumed by the cell;
        determine, for each cell of the subset and based on the power grid, an affected vicinity for the cell comprising one or more neighboring cells of the plurality of cells affected by a current drawn on the cell;
        determine an affected vicinity for the tile based on the affected vicinity for each cell of the subset;
        calculate a voltage drop for the tile based on the voltage drop for each cell of the affected vicinity for the tile; and
        detect a voltage deviation for the tile when a difference between the voltage budget for the tile and the voltage drop for the tile exceeds a pre-determined threshold.

9. The system of claim 8, further comprising a power grid adapter configured to:
    add a power grid sub-structure to the power grid to address the voltage deviation, wherein the power grid sub-structure comprises one or more new power lines, wherein the voltage deviation represents a voltage deficit.

10. The system of claim 9, wherein the power grid adapter is further configured to:
    determine a resistance adjustment factor for the power grid sub-structure, wherein the resistance adjustment factor describes an amount by which the power grid sub-structure adjusts the resistance of the power grid; and
    add the power grid sub-structure to the repository.

11. The system of claim 10, wherein the power grid adapter is further configured to:
    retrieve the power grid sub-structure from the repository based on matching the voltage deviation to the resistance adjustment factor.

12. The system of claim 8, wherein the power grid adapter is further configured to:
   remove a power grid sub-structure from the power grid to address the voltage deviation, wherein the power grid sub-structure comprises one or more power lines of the plurality of power lines, wherein the voltage deviation represents a voltage surplus.

13. The system of claim 8, wherein determining the activity factor for the cell comprises:
   determining an expected number of elements of the cell switching on within a clock cycle of the cell.

14. The system of claim 8, wherein determining the affected vicinity for the cell comprises:
   determining a voltage-sensitive layer of the plurality of layers at which a current draw of the cell affects a neighboring cell of the plurality of cells, wherein the neighboring cell is located at the voltage-sensitive layer.

15. A non-transitory computer readable medium comprising instructions that, when executed by a computer processor, perform a method comprising:
   obtaining a design for a chip comprising a plurality of cells and a power grid comprising a plurality of power lines, wherein each cell of the plurality of cells is located at a layer of a plurality of layers;
   dividing the design into a plurality of tiles, each tile of the plurality of tiles comprising a subset of the plurality of cells;
   determining a voltage budget for a tile of the plurality of tiles;
   measuring resistivity for a fabrication technology used in the design;
   determining, using the measured resistivity, a peak current consumed by each cell of the subset of the plurality of cells of the tile;
   calculating a voltage drop for each cell of the subset of the plurality of cells of the tile based on determining an activity factor for the cell and the peak current consumed by the cell;
   determining, for each cell of the subset and based on the power grid, an affected vicinity for the cell comprising one or more neighboring cells of the plurality of cells affected by a current drawn on the cell;
   determining an affected vicinity for the tile based on the affected vicinity for each cell of the subset;
   calculating a voltage drop for the tile based on the voltage drop for each cell of the affected vicinity for the tile; and
   detecting a voltage deviation for the tile when a difference between the voltage budget for the tile and the voltage drop for the tile exceeds a pre-determined threshold.

16. The non-transitory computer readable medium of claim 15, further comprising:
   adding a power grid sub-structure to the power grid to address the voltage deviation, wherein the power grid sub-structure comprises one or more new power lines, wherein the voltage deviation represents a voltage deficit.

17. The non-transitory computer readable medium of claim 16, further comprising:
   determining a resistance adjustment factor for the power grid sub-structure, wherein the resistance adjustment factor describes an amount by which the power grid sub-structure adjusts the resistance of the power grid; and
   adding the power grid sub-structure to a repository.

18. The non-transitory computer readable medium of claim 17, further comprising:
   retrieving the power grid sub-structure from the repository based on matching the voltage deviation to the resistance adjustment factor.

19. The non-transitory computer readable medium of claim 15, further comprising:
   removing a power grid sub-structure from the power grid to address the voltage deviation, wherein the power grid sub-structure comprises one or more power lines of the plurality of power lines, wherein the voltage deviation represents a voltage surplus.

20. The non-transitory computer readable medium of claim 15, wherein determining the activity factor for the cell comprises:
   determining an expected number of elements of the cell switching on within a clock cycle of the cell.

* * * * *